United States Patent Office 2,931,806
Patented Apr. 5, 1960

2,931,806 dl-Δ⁵-3-ETHYLENEDIOXY-11-KETO-20-CYANO PREGNENES

Lewis H. Sarett, Princeton, N.J., assignor to Merck & Co., Inc., Rahway, N.J., a corporation of New Jersey No Drawing. Application September 20, 1952
Serial No. 310,730

2 Claims. (Cl. 260—239.55)

This invention relates to novel steriod compounds and processes of preparing the same. More particularly, it is concerned with the synthesis of cortisone from steroid compounds obtained by total synthesis. Specifically, it is concerned with novel derivatives of $\Delta^4$-3,11,20-triketo-21-hydroxypregnene, processes for the preparation of these compounds, and methods of converting these compounds to cortisone esters.

The copending application Serial No. 310,135, filed September 17, 1952, now U.S. Pat. No. 2,777,842, describes the final steps of a process for the preparation of steroid compounds of the formula:

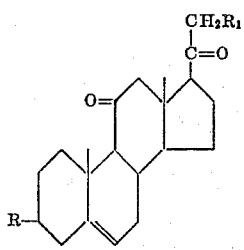

wherein R represents a substituent convertible to keto by hydrolysis and $R_1$ represents an acyloxy substituent, by total synthesis.

It is an object of my present invention to provide a process for converting these compounds to cortisone esters. A further object is to provide novel intermediate compounds useful in the preparation of cortisone esters. Other objects will be apparent from the detailed description hereinafter provided.

In accordance with my present invention, cortisone esters are obtained by processes which can be represented chemically as follows.

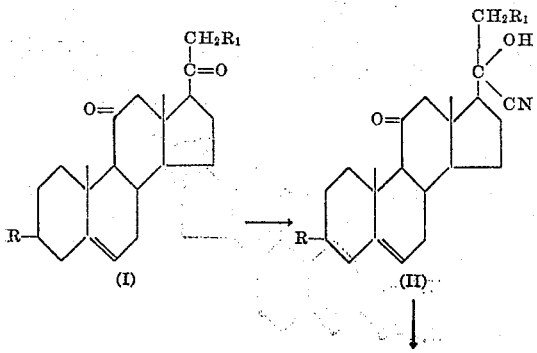

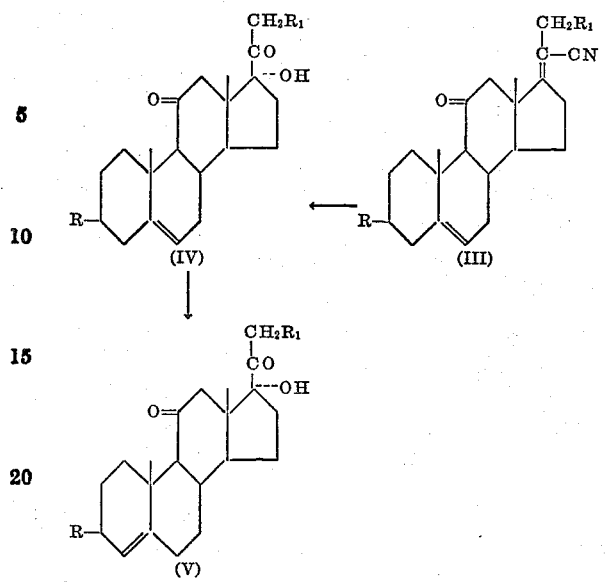

wherein R represents a substituent convertible to keto by hydrolysis, and $R_1$ represents an acyloxy substituent.

In this process, a $\Delta^5$-11,20-diketo-21-acyloxypregnene having at C-3 a substituent convertible to keto by hydrolysis (I) is converted to the corresponding cyanohydrin by intimately contacting a solution containing the starting material with hydrogen cyanide. The cyanohydrin (II) is then dehydrated by reaction with a dehydrating agent to obtain the corresponding $\Delta^{5,17(20)}$-pregnadiene (III). The latter compound on treatment with an oxidizing agent is converted to the corresponding 17-hydroxypregnene (IV). Upon hydrolysis with acid the 17-hydroxypregnene is converted to the cortisone ester (V).

The methods of my invention can be more readily understood by the illustrative application of these processes to the conversion of a specific $\Delta^5$-3,11,20-triketo-21-acyloxy-derivative to the corresponding cortisone ester. Thus, in accordance with an embodiment of my invention, $\Delta^5$-3-ethylenedioxy-11,20-diketo-21-acetoxypregnene can be converted to cortisone acetate.

In the first step of this process, a solution of the starting material is intimately contacted with hydrogen cyanide to obtain $\Delta^5$-3-ethylenedioxy-11-keto - 20 - cyano-20-hydroxy-21-acetoxypregnene. Solvents for the starting material which are inert to the action of hydrogen cyanide, such as hydrocarbons, halogenated hydrocarbons, ethers, and the like, are suitable mediums for carrying out this reaction. Generally, I find it desirable to add a small amount of an organic base such as triethylamine to the reaction mixture for the obtainment of maximum yields although the reaction can also be carried out without the addition of the organic base.

The dehydration of the cyanohydrin to obtain $\Delta^{5,17(20)}$-3-ethylenedioxy-11 - keto - 21-acetoxypregnadiene is accomplished by reacting $\Delta^5$-3-ethylenedioxy - 11 - keto-20-hydroxy - 20 - cyano-21-acetoxypregnene with a dehydrating agent. The reaction is most conveniently effected by reacting the cyanohydrin with phosphorous oxychloride in the presence of pyridine at room temperature for about 16 hours. The $\Delta^{17}$-20-cyano compound is recovered by diluting the reaction mixture with water and allowing the reaction mixture to stand, whereupon the product precipitates in crystalline form.

The C-17 hydroxyl group is then introduced by treating the $\Delta^{5,17(20)}$-20-cyanopregnadiene compound with an oxidizing agent, preferably a permanganate salt such as an alkali metal or alkaline earth metal permanganate. For example, this reaction can be readily carried out by intimately contacting a solution of $\Delta^{5,17(20)}$-3-ethylenedioxy-11-keto-20-cyano-21-acetoxypregnadiene in acetone with powdered potassium permanganate at a temperature of about 0° C. for about one and one half hours. The reaction mixture is then decomposed by the addition of a solution of sodium sulfite and dilute sulfuric acid. The desired product is recovered by extracting the acidified reaction mixture with a water immiscible solvent for the product, such as chloroform. Upon evaporation of the solvent extracts $\Delta^5$-3-ethylenedioxy-11,20-diketo-17α-hydroxy-21-acetoxypregnene is obtained in crystalline form.

In the final step of my process, the protecting ethylenedioxy substituent is cleaved by hydrolysis with acid to regenerate the 3-keto substituent and cause a shifting of the double bond from the 5,6 position to the 4,5 position, thereby forming cortisone acetate. Thus, the hydrolysis is conveniently effected by heating a suspension of $\Delta^5$-3-ethylenedioxy-11,20-diketo-17α-hydroxy-21-acetoxypregnene in acetone with p-toluene sulfonic acid. The cortisone ester is obtained by diluting the reaction mixture with water whereupon the product is obtained in crystalline form.

The above described reactions can also be carried out using dl-$\Delta^5$-3-ethylenedioxy-11,20-diketo-21-acetoxypregnene to obtain the racemic cortisone ester, dl-cortisone acetate.

In carrying out the above described process other similar derivatives of $\Delta^4$-3-,11,20-triketo-21-hydroxypregnene can also be employed as the starting material in place of the 3-ethylenedioxy-21-acetoxy derivative. Thus, the 3-keto group can be protected by a different substituent, such as another ketal group or an enol ether group, which can be converted by acid hydrolysis to regenerate the keto group. Similarly, other esters wherein the 21-acetoxy group is replaced by a different acyloxy substituent can be used in place of the acetoxy derivative. When another ester is used as the starting material, the corresponding cortisone ester is obtained.

The following examples illustrate methods of carrying out my invention.

EXAMPLE 1

$\Delta^5$-3-ethylenedioxy-11-keto-20-hydroxy-20-cyano-21-acetoxypregnene

A solution of 380 mg. of $\Delta^5$-3-ethylenedioxy-11,20-diketo-21-acetoxypregnene in 3 cc. of ethylene dichloride was treated with 0.3 cc. of liquid hydrogen cyanide and 0.05 cc. of triethylamine. After ten minutes, 3.0 cc. of absolute ether was added. The partially crystalline mixture was treated with an additional 3.0 cc. of ether after 1 hour. At the end of three hours, the product, $\Delta^5$-3-ethylenedioxy-11-keto-20-hydroxy-20-cyano-21-acetoxypregnene, was filtered. Recrystallization from chloroform-ether gave the pure cyanhydrin, M.P. 220–224° C. (dec.).

When the racemic mixture, dl-$\Delta^5$-3-ethylenedioxy-11,20-diketo-21-acetoxypregnene, was reacted in the manner described above, dl-$\Delta^5$-3-ethylenedioxy-11-keto-20-hydroxy-20-cyano-21-acetoxypregnene, M.P. 220–225° C. (dec.) was obtained.

EXAMPLE 2

$\Delta^{5,17(20)}$-3-ethylenedioxy-11-keto-20-cyano-21-acetoxypregnadiene

A solution of 135 mg. of $\Delta^5$-3-ethylenedioxy-11-keto-20-hydroxy-20-cyano-21-acetoxypregnene in 0.7 cc. of pyridine was treated with 0.07 cc. of phosphorous oxychloride. After standing at room temperature overnight the reaction mixture was diluted with water. After standing, the aqueous mixture deposited crystals of $\Delta^{5,17(20)}$-3-ethylenedioxy-11-keto-20-cyano-21-acetoxypregnadiene which after recrystallization was found to melt at 203° C.

When the above procedure was repeated using dl-$\Delta^5$-3-ethylenedioxy-11-keto-20-hydroxy-20-cyano - 21 - acetoxypregnene as the starting material, dl-$\Delta^{5,17(20)}$-3-ethylenedioxy-11-keto-20-cyano-21-acetoxypregnadiene melting at 181–183° C. was obtained.

EXAMPLE 3

$\Delta^5$-3-ethylenedioxy-11,20-diketo-17α-hydroxy-21-acetoxypregnene

A solution of 102 mg. of $\Delta^{5,17(20)}$-3-ethylenedioxy-11-keto-20-cyano-21-acetoxypregnadiene in 3.5 cc. of acetone containing 0.11 cc. of piperidine was cooled to 0° C. and treated with 94 mg. of powdered potassium permanganate. After stirring the mixture for 1½ hours at 0° C., 0.2 cc. of acetone containing 0.02 cc. of acetic acid was added. The mixture was stirred an additional 1½ hours at room temperature and then decomposed with a solution of sodium bisulfite and dilute sulfuric acid. The mixture was extracted with chloroform, the chloroform extract washed with water, stirred with a 5% aqueous solution of potassium carbonate and then concentrated in vacuo to remove the chloroform. The resulting crystalline suspension was filtered and washed with water and methanol, giving $\Delta^5$-3-ethylenedioxy-11,20-diketo-17α-hydroxy -21- acetoxypregnene. Recrystallization from pyridine-methanol gave pure material, M.P. 262–267° C. with decomposition.

When the above described procedure was repeated using dl-$\Delta^{5,17(20)}$-3-ethylenedioxy-11-keto-20-cyano-21-acetoxypregnene as the starting material, dl-$\Delta^5$-3-ethylenedioxy-11,20-diketo-17α-hydroxy-21-acetoxypregnene melting at 247–252° C. was obtained.

EXAMPLE 4

Cortisone acetate

A suspension of 50 mg. of 3-ethylenedioxy-$\Delta^5$-pregnene-17α,21-diol-11,20-dione 21-acetate in 3 cc. of acetone containing 15 mg. of p-toluene sulfonic acid was refluxed for 20 minutes. Dilution with water gave crystalline cortisone acetate, M.P. 238–244° C.

When the above-described procedure was repeated using dl-$\Delta^5$-3-ethylenedioxy - 11,20-diketo-17α-hydroxy-21-acetoxypregnene as the starting material, dl-cortisone acetate melting at 240–245° C. was obtained.

The compounds employed as starting materials in Example 1, namely, $\Delta^5$-3-ethylenedioxy-11,20-diketo-21-acetoxypregnene and dl-$\Delta^5$-3-ethylenedioxy-11,20-diketo-21-acetoxypregnene can be prepared as described in copending application Serial No. 310,135, filed September 17, 1952.

Various changes and modifications may be made in carrying out the present invention without departing from the spirit and scope thereof. Insofar as these changes and modifications are within the purview of the annexed claims, they are to be considered as part of my invention.

I claim:

1. dl-$\Delta^{5,17(20)}$-3-ethylenedioxy-11-keto-20-cyano-21-acetoxypregnadiene of the formula

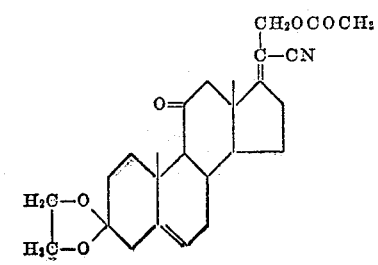

2. dl-Δ⁵-3-ethylenedioxy-11-keto-20-cyano-20-hydroxy-21-acetoxypregnene of the formula
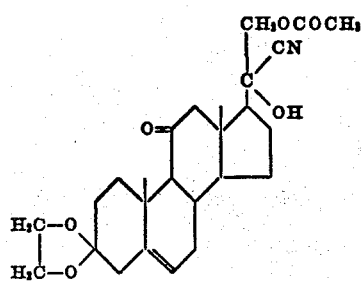
References Cited in the file of this patent
UNITED STATES PATENTS
| | | |
|---|---|---|
| 2,352,568 | Reichstein | June 27, 1944 |
| 2,541,104 | Sarett | Feb. 13, 1951 |
| 2,558,785 | Sarett | July 3, 1951 |
| 2,558,786 | Sarett | July 3, 1951 |
| 2,597,190 | Sarett | May 20, 1952 |
| 2,622,081 | Bernstein | Dec. 16, 1952 |
| 2,646,434 | Bernstein | July 21, 1953 |
| 2,655,517 | Slomp | Oct. 13, 1953 |
OTHER REFERENCES
Fieser and Fieser: "National Products Related to Phenanthrene," 3rd edition (1949), pages 407, 449, 450 and 451.